United States Patent [19]

Crawford

[11] Patent Number: 4,756,540
[45] Date of Patent: Jul. 12, 1988

[54] WHEELED MECHANISM

[76] Inventor: Henry B. Crawford, Blue Hills, Blowing House Hill, Ludgvan, Penzance, Cornwall TR20 8AW, United Kingdom

[21] Appl. No.: 939,252

[22] Filed: Dec. 5, 1986

Related U.S. Application Data

[63] Continuation of Ser. No. 725,825, Apr. 22, 1985, abandoned.

[51] Int. Cl.⁴ .............................................. B62B 1/02
[52] U.S. Cl. ................................ 280/47.21; 280/47.28; 280/47.29; 280/47.37 R
[58] Field of Search ............... 280/47.21, 47.22, 47.26, 280/47.29, 43.1, 47.27, 46, 47.37 R, 47.28; 414/446, 456

[56] References Cited

U.S. PATENT DOCUMENTS

| | | | |
|---|---|---|---|
| 197,328 | 1/1877 | Byron | 280/43.1 |
| 863,275 | 8/1907 | Haffey | 280/47.21 |
| 993,265 | 5/1911 | McCoy | 280/47.22 |
| 1,006,985 | 10/1911 | Smith | 280/47.29 |
| 1,934,289 | 11/1933 | White | 280/47.28 |
| 2,096,994 | 10/1937 | Millen | 280/47.21 |
| 2,710,106 | 6/1955 | Hanson | 280/47.21 |
| 3,456,960 | 7/1969 | Rector | 280/47.29 |
| 4,185,853 | 1/1980 | Thurmond | 280/47.29 |
| 4,531,752 | 7/1985 | Diener | 280/47.26 |

FOREIGN PATENT DOCUMENTS

| | | | |
|---|---|---|---|
| 1578137 | 4/1969 | France | 280/47.21 |
| 2351839 | 12/1977 | France | 280/47.21 |
| 2530569 | 1/1984 | France | 280/47.21 |
| 566932 | 1/1945 | United Kingdom | 280/47.21 |

*Primary Examiner*—David M. Mitchell
*Attorney, Agent, or Firm*—Gifford, Groh, VanOphem, Sheridan, Sprinkle and Dolgorukov

[57] ABSTRACT

A wheeled mechanism which may be used as a trolley or a walking frame for the disabled comprises a frame carried on at least two ground wheels on a single axis so as to be turnable about the said axle; the frame includes an operating handle, and pivotally mounted to the frame is a rigid leg frame or member pivoted at or adjacent one end thereof to the main frame so as to be tunable about a second axis substantially parallel to the said wheel axle; the length of this leg frame or member is such that the end remote from the second pivot axis is engageable on the ground in a first relative orientation of the leg frame or member and the main frame, and can be raised from the ground upon relative turning movement of the leg frame or member and the main frame about the second axis.

9 Claims, 4 Drawing Sheets

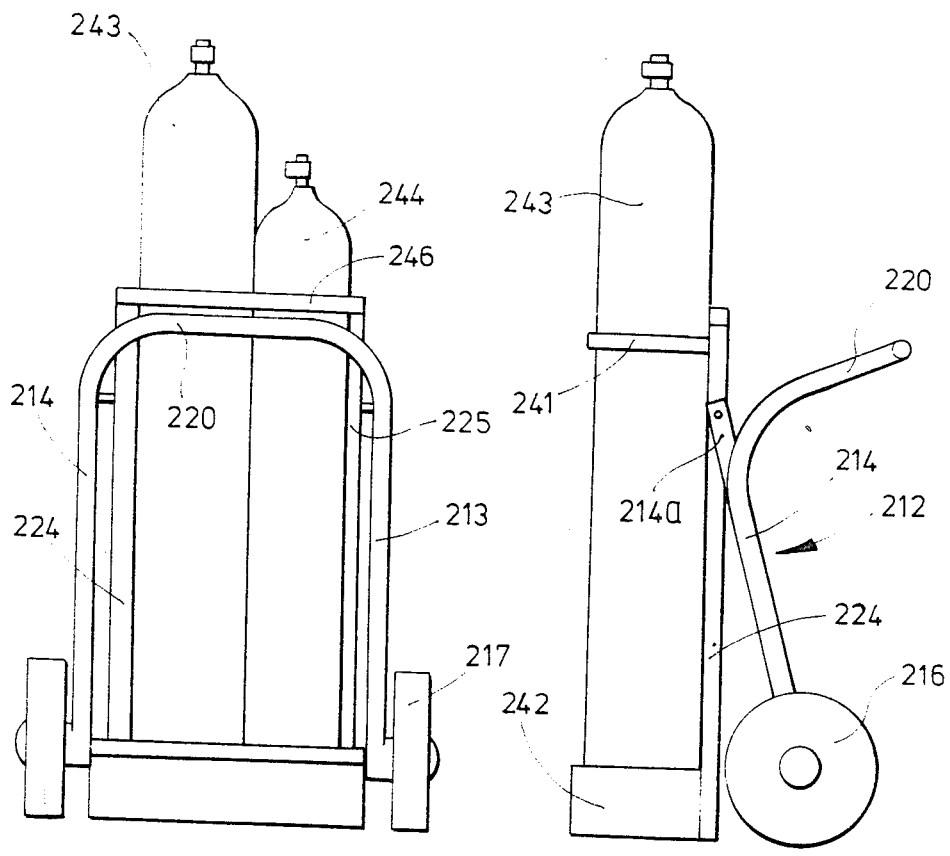

4,756,540

WHEELED MECHANISM

This is a continuation of co-pending application Ser. No. 725,825, filed on Apr. 22, 1985, now abandoned.

BACKGROUND OF THE INVENTION

The present invention relates to a wheeled mechanism which can be used as a trolley for conveying loads or which may be adapted as a support frame for assistance with walking for the disabled.

One known prior art trolley is the so-called sackbarrow, which comprises a rigid generally L-shaped frame with a pair of wheels pivoted at the intersection of two approximately orthogonal arms of the frame. The lower arm is generally horizontal and very much shorter than the vertical arm and this latter has a pair of handles at the upper end.

Sackbarrows have the disadvantage that loading and unloading involves tipping the load to a substantial degree in order to introduce the platform constituted by the horizontal arm of the L-shape frame. Further, the weight of the load is to a large extent effectively carried by the operator through the handle, particularly if the frame is inclined at a substantial angle to the vertical in operation, and there is a risk that the load will tip and fall off if the load-bearing platform is placed on the ground, for example, to allow the operator to rest. Other known prior art trollies include a trolley having four wheels, two of which are steerable, and which provides a load-bearing platform on a frame spanning the wheels. Such a trolley is complex, expensive and difficult to maneuver whilst, although a sack-barrow is of simple construction, it is difficult to operate and requires great strength of the user. Further it is necessary to lift a load from the ground up on to the load-bearing platform of a four wheel trolley, which particularly in the case of the elderly or infirm, or if a rather heavy load is involved, can be a very serious disadvantage.

OBJECTS OF THE INVENTION

The primary object of the present invention is to provide a wheeled mechanism which can be used as a load bearing trolley or barrow and which will not suffer from the disadvantages of the known sack-barrow and at the same time will be simpler and more economical to manufacture than known four-wheeled trolleys.

Another object of the invention is to provide a wheeled mechanism usable as a trolley, in which the load can if required be kept upright, without tilting, at all times.

A further object of the invention is to provide a trolley which has a load platform which can be raised or lowered by manipulation of the operating handle.

Still another object of the invention is to provide a trolley in which the operator can safely lower the load if fatigued, and may also rest his or her weight on the handle without risk of the trolley rolling away.

Yet a further object of the invention is to provide a trolley suitable for the elderly or infirm, which can be manipulated easily without requiring great strength even when handling quite heavy loads such as, for example, a 50 kg sack of coal or the like.

Still a further object of the invention is to provide a trolley which can be used with only one hand, leaving the other hand free for a stick, and for manipulation of doors, gates, etc.

A general object of the invention is to provide a trolley by which a user can move a load from place to place without the load having to be lifted or carried by the user at any time.

SUMMARY OF THE INVENTION

According to the present invention there is provided a wheeled mechanism for transporting a load or for other purposes; said mechanism comprising a main frame, at least two ground wheels mounted on said frame so as to be turnable about a common axis, an operating handle on said frame, substantially rigid leg frame means, pivotal connection means pivotally connecting said rigid leg frame means at or adjacent one end thereof on said main frame so as to be turnable about a second pivot axis substantially parallel to said common axis, the length of said leg frame means being slightly less than the distance from said pivotal connection means to the ground contacting points of said wheels such that the end of said rigid leg frame means remote from said second pivot axis is engageable on the ground in a first relative orientation of said leg frame means and said main frame and is raised from the ground upon relative turning movement of said leg frame means and said main frame about said second axis to a second relative orientation thereof.

With the leg frame or member raised from the ground the wheels of the mechanism can be rolled in a conventional manner to allow the mechanism to be moved freely and easily from place to place. If the mechanism is adapted as a load-bearing trolley, the leg frame or member may be provided with a support platform or container and it is a particular feature of the present invention that the leg frame or member is movable between a first and a second position with respect to the main support frame and in the second position the support surface of the platform or container is generally parallel with the ground so that any load requiring it can be maintained in a strictly upright orientation. Known trolleys of the sack-barrow type have inevitably tilted the load in order to make it possible for the load to be raised from the ground.

It is further envisaged that the operating handle may be linked to the main support frame by a cranked portion thereof so that the operating handle is positioned spaced from a vertical plane including the axis thereof in a direction away from the support platform or container so that the leverage which can be applied by the handle is sufficiently great to be able to control even substantial loads on the platform or container without requiring the application of a very great force at the handle.

It is a further feature of the present invention that relative movement between the main support frame and the leg frame or member is limited by abutment stop means to determine the said first relative position. In this first relative position the ground engaging end of the leg frame or member is in contact with the ground and movement of the handle in the same direction as displacement between the second position and the first position is prevented by such abutment stop means, forces exerted on the handle being transferred to the ground through the ground-engaging means. When the operator wishes, therefore, it is possible simply to lower the container or platform onto the ground and to allow the weight of the user's body to rest on the handle without risk that the mechanism will roll on the wheels. For the elderly or infirm, therefore, who may require frequent rest periods, this is a considerable advantage since the mechanism can be used as a support to lean on at intervals during a passage between one place and another transporting a load.

This aspect of the invention also enables it to be used as a replacement for conventional ambulant assistance support frames for the infirm. People having injured legs or spines, can particularly benefit from this arrangement. In such an embodiment the ground-engaging member, instead of being formed as a platform or container, is formed as a foot having frictional properties in order to increase the frictional resistance between the foot and the ground. Such properties may be provided, for example, by suitably covering the ground-engaging surface of the foot with rubber or plastics material having an appropriate coefficient of friction.

Likewise, in such an embodiment, the operating handle may be provided as a U-shape partially encircling the body of the user. Then, by rocking the support handle towards the user the ground-engaging foot can be released from the ground allowing the wheels to roll so that the invalid can walk partly supported by the rolling wheels; in such circumstances it is envisaged that the ground-engaging foot will still be slightly in contact with the ground so that a degree of frictional resistance which can be controlled by the operator acting on the handle, can be maintained for control purposes. When required it is only necessary then to push the handle slightly away from the body of the operator in order to re-engage the ground-engaging foot on the ground so that the whole weight of the operator can be allowed to rest on the support frame which, conveniently, is located just below elbow height. Alternatively, an additional ground-engaging foot may be provided on the other side of the axis of the wheels of the main frame. The wheels may then only roll when a balance position between two terminal positions is achieved and tilting of the operating handle to either side of this balance position, beyond a certain angle, will result in one or other of the two ground-engaging feet coming into contact with the ground and preventing further rolling movement of the wheels whilst at the same time providing support on which an operator may lean.

Embodiments of the present invention may also be made for special purposes, for example, a trolley may be formed for carrying and supporting gas bottles such as propane or oxygen and acetylene bottles such as are used for welding. In such an embodiment the leg frame or member is formed as a frame with a support platform for the gas bottles and restraining means at the top and bottom to ensure that they are held to this frame. In such an embodiment it may be convenient to form the pivotal connection between the frame of the wheeled mechanism and the leg member in such a way that the two can be separated at will. Such a releasable pivotal connection may be made, for example, by suitable hook shape engagement members on the frame, which can be released upon displacement of the leg frame from the first to the second position in which the leg member engages the ground; in this position the wheels of the frame may be spaced from the ground thereby leaving available movement in a vertical direction.

The present invention also comprehends a wheeled mechanism as defined above formed as a trolley with means for receiving an enlarged platform removably attachable to the leg frame or member. Such enlarged platform may be suitable, for example, for retaining a dustbin or like dimensioned article, and has the advantage that, with the platform flat on the ground it can be moved under the dustbin by sliding, and subsequently raised without tilting the dustbin simply by displacing the frame from the second to the first position. In the first position the platform is held by the frame spaced a short distance from the ground and in a horizontal plane. Of course, like a sack-barrow, the platform can be tilted to move the centre of gravity of the article supported thereby more closely towards the axis of the ground wheels. However, because the operating handle is spaced from the vertical plane including the axis of the ground wheels when the mechanism is in the said first position, additional leverage for manipulating such weight is readily available without requiring the operator to exert a large force.

For convenience, the load-bearing platform may be removable or may be pivotally connected to the leg member or frame constituting the leg member to allow it to be folded flat against the frame.

Likewise, for convenience in storage, the operating handle may be formed such that it can be folded flat or telescoped within a part of the frame.

It is envisaged that embodiments of the present invention may also be made with a seat fixed to or attachable to the leg member or frame constituting the leg member for use as a baby carriage for supporting and transporting infants. Such an arrangement has the advantage of being self-braking in the sense that when the operating handle is released, the mechanism as a whole will turn about the ground-engaging wheels until the leg frame comes into contact with the ground whereupon the frictional engagement of this with the ground will prevent any movement or further movement.

Other features and advantages of the invention will become apparent from a consideration of the following description, in which reference will be made to the accompanying drawings, and which is provided purely by way of non-limitative example.

BRIEF DESCRIPTION OF THE DRAWINGS

FIG. 6 is a rear view of a second alternative embodiment; and

FIG. 7 is a side view of the embodiment of FIG. 6.

DESCRIPTION OF THE PREFERRED EMBODIMENTS

Figure 1:
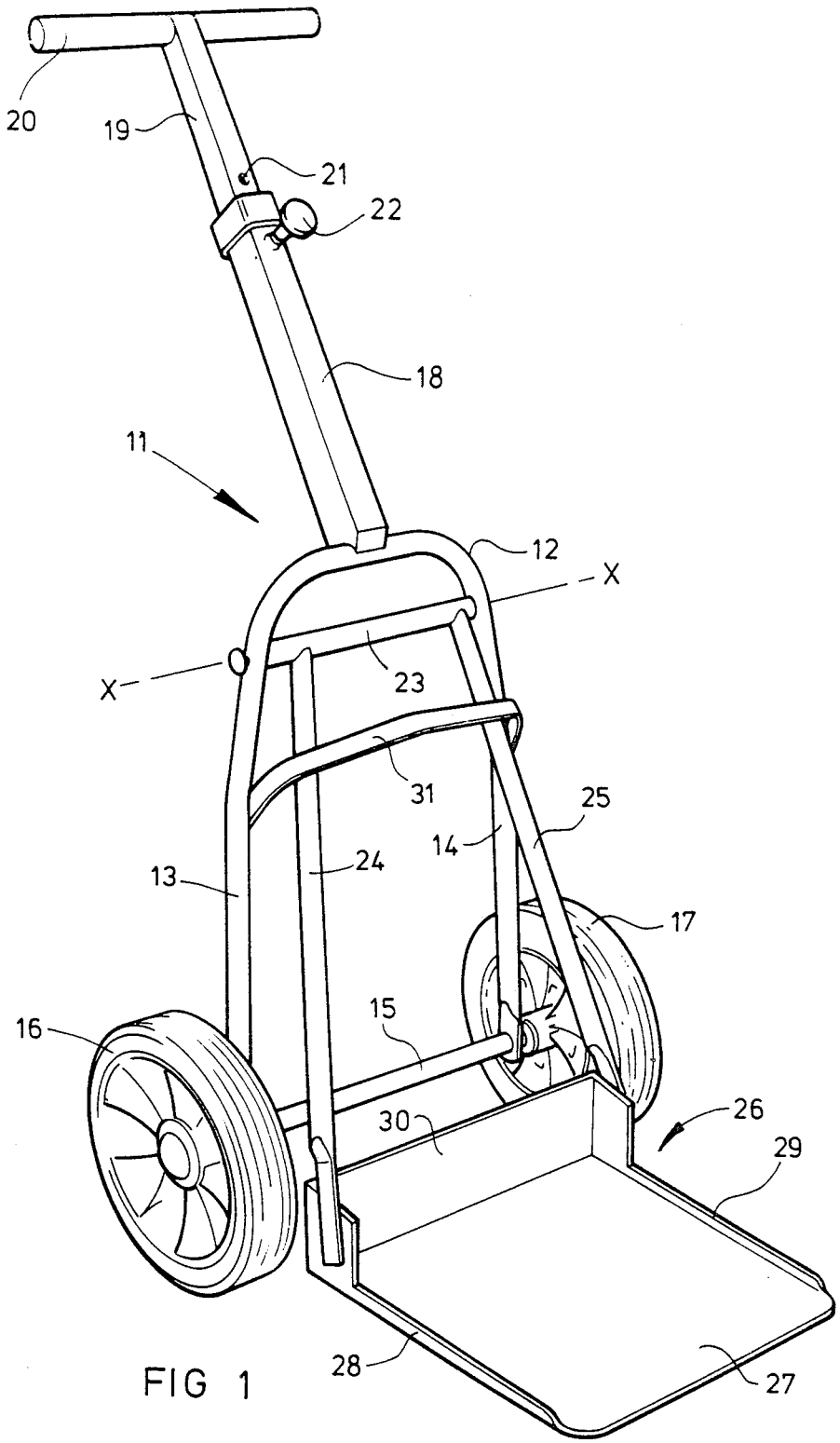
FIG. 1 is a perspective view of an embodiment of the invention constructed as a load-bearing trolley.

Referring now to the drawings, the trolley illustrated is generally indicated with the reference numeral 11 and comprises a generally U-shape main frame 12 having arms 13, 14 joined at their free ends by an axle 15 carrying two wheels 16, 17, one at each end.

From the bight portion of the U-shape frome 12 extends an upright column 18 within which telescopically slides a handle extension 19 having, at its free upper end, a transverse operating handle 20.

The telescopic handle extension 19 has a plurality of holes 21 and the column 18 has a spring loaded plunger 22 engaged selectively in one of the holes 21 to determine the effective length of the handle extension 19 by selection of its projection distance from the column 18. The height of the transverse handle 20 above the ground can thus be easily adjusted. Alternative adjustment systems are also possible, however.

Extending transversely across the U-shape frame 12 is a cross beam 23 pivoted aboue an axis X—X at each end to a respective arm 13, 14 and having two downwardly divergent support legs 24, 25 to the lower end of which is secured a platform generally indicated 26 in the form of a shallow tray having a flat bottom 27 and left and right sides 28, 29 and an upright back 30. The interconnection between the legs 24, 25 and the platform 26 is made by welding or bolting the lower ends of the legs 24, 25 to the side walls 28, 29 respectively in such a way that a rigid interconnection at a predetermined fixed angle between the plane of the platform bottom 27 and the plane defined by the two legs 24, 25 is obtained. As shown in the drawings, the side walls 28, 29 are each formed as a very small lip over most of the length of the side, with an enlarged rear panel for attachment to the associated leg 24 or 25. This allows a large object to be placed across the platform 26 resting on the upper edges of the side walls 28, 29. In an alternative embodiment (not shown) the platform is pivotally mounted to the legs 24, 25 such as by pivot pins, in such a way that it can be folded flat for storage.

Finally, the two arms 13, 14 of the U-shape main frame 12 are spanned by a curved strap 31 which serves as an abutment to limit the pivotal movement of the legs 24, 25 about the cross member 23. Movement of these legs 24, 25 in the opposite direction is limited by abutment of the platform tray or the legs themselves against the axle 15. The effect of the limited articulation of the sub-frame constituted by the legs 24, 25 and the cross member 23 with respect to the U-shape main frame 12 will be described hereinbelow with reference to FIGS. 2, 3 and 4.

In an alternative embodiment (not illustrated) the legs 24, 25 are replaced by a single leg extending from the cross members 23 to the platform 26.

Figure 2:
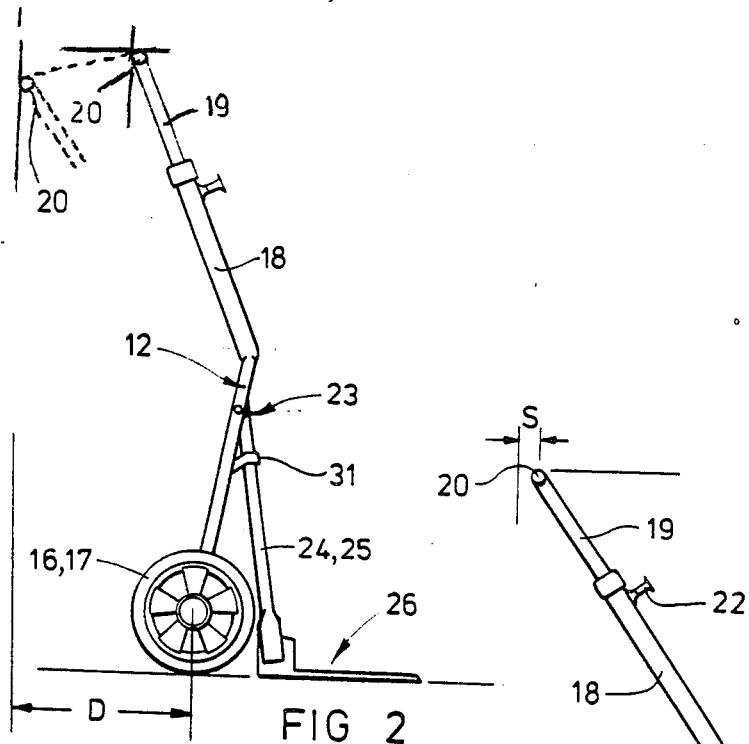
FIG. 2 is a side view of the embodiment of FIG. 1 in a first position.

Referring now to FIG. 2, the trolley 11 is shown in a first position with the platform 26 flat on the ground. In this position the main frame 12 has been turned about the cross member 23, in a clockwise direction as viewed in FIG. 2, to its maximum extent; the arms 13, 14 of the main frame 12 have turned about the pivot constituted by the cross member 23 until, with the wheels 16, 17 still on the ground, the platform pan 26 now rests flat on the ground. With further clockwise movement of the main frame 12 the strap 31 will be brought into contact with the legs 24, 25 of the sub-frame, therefore preventing any further movement of the handle 20 and locking the mechanism with the upright column 18 and handle extension 19 at their highest position almost parallel with the legs 24, 25 of the sub-frame.

Figure 3:
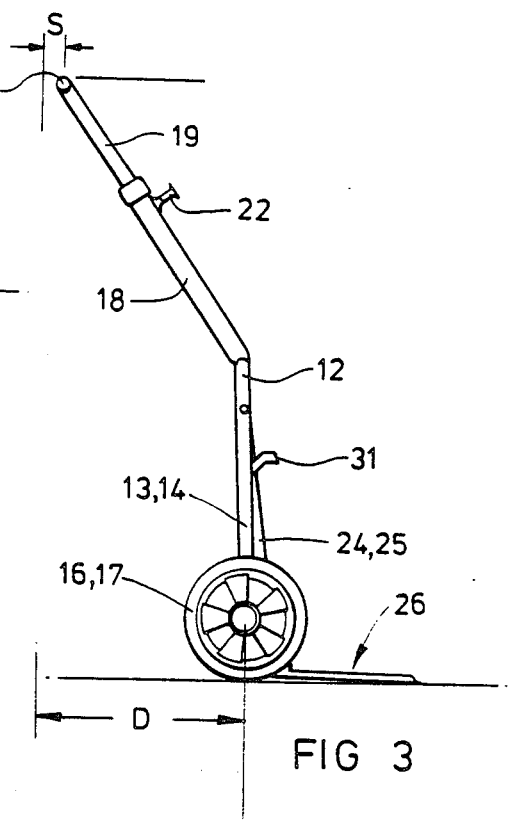
FIG. 3 is a side view of the embodiment of the invention in a second position.

The position illustrated in FIG. 3 is achieved by pulling the handle 20 downwardly and to the left as viewed in FIG. 3 without displacing the platform 26 from the ground. This has the effect of turning the main frame 12 about the crossmember 23 which is held fixed due to the contact of the platform 26 with the ground and the rigid interconnection of the legs 24, 25 with the platform 26. This movement is continued until the axle 15 is brought into contact with the rear wall 30. Because the distance from the ground contacting point of the periphery of the wheels 16, 17 to the pivot axis X-X of the cross member 23 is slightly greater than the distance from the cross member 23 to the back of the platform 26 where it joins the legs 24, 25 the back of the platform 26 is raised slightly from the ground as the axle 15 is brought into contact with the rear wall 30. At this point the front edge of the bottom wall 27, of the platform 26 is still in contact with the ground.

Figure 4:
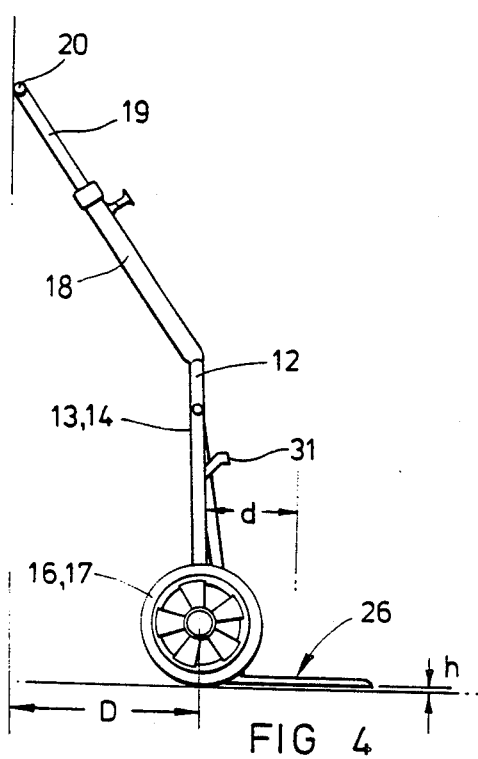
FIG. 4 is a side view of the embodiment in a third operating position.

Finally, by further turning the handle 20 in an anti-clockwise direction as viewed in FIG. 4 the whole mechanism is rocked about the wheels 16, 17 with the main frame 12 and sub-frame constituted by the cross member 23 and legs 24, 25 being locked together by engagement of the axle 15 with the rear wall 30 of the platform 26 until this latter is horizontal, or more precisely, parallel with the ground and raised above it by the height h as shown in FIG. 4.

Because the column 18 is at a substantial angle with the plane defined by the main frame 12, the handle 20 is horizontally displaced, in this third position, by a distance D from the vertical centre line through the wheels 16, 17 which is greater than the distance d of the assumed centre of gravity at the centre of the platform 26 of any load carried thereby. This leverage D/d gives the operator a considerable mechanical advantage in handling the trolley, 11 even with a substantial load on the platform 26.

The distance D is also shown in FIG. 3 to illustrate the small distance S moved by the handle 20 in converting from the position illustrated in FIG. 3 to that illustrated in FIG. 4, that is for raising the front edge of the platform 26 to the horizontal position from the inclined position of FIG. 3.

The position of the handle 20 when the mechanism is in the position illustrated in FIG. 4 is shown in broken outline in FIG. 2 identified with the reference numeral 20'. The movement of the handle 20 between the two positions can be seen to be small and easily accomplished so that an operator can lower the load onto the ground and even allow his or her own weight to rest on the handle 20 if desired. Because the platform 26 rests flat on the ground in the position illustrated in FIG. 2 it can easily be loaded by sliding the load onto the bottom wall 27 of the platform 26 or by pushing the trolley 11 to introduce the bottom wall 27 under the load. Should it be necessary to maintain the load vertical, for example, if this were a bucket of water or the like, this can readily be achieved by holding the trolley 11 in the position of FIG. 4 as it is moved along.

Alternatively, if desired, the handle 20 can be moved further in an anti-clockwise direction in order to tilt the platform 26 so that a part of the load, for example if this were a sack or other heavier load, can be borne by the main frame 12 and balanced by the inclination of this with respect to the vertical.

The platform 26 may be pivotally mounted to the support legs 24, 25 in order to allow it to be folded for storage. Suitable abutment means (not shown) would be provided to locate the platform 26 in the working position illustrated in FIG. 1, and the pivotal connection would allow it to be turned until the platform 26 is approximately parallel with the legs 24, 25 so that the front to back dimension of the trolley 11 is reduced substantially.

It will be appreciated from FIGS. 2 and 4 how the present invention may be adapted as an aid to walking for invalids or the infirm. The platform 26 would be replaced by a ground-engaging foot having a suitable ground-engaging area and of a material having a high coefficient of friction on the lower face, and the handle 20 could be replaced with a generally U-shape frame having horizontal arms which would pass to either side of the body of a person standing immediately behind the handle 20 so that support in three directions is available.

Then, by leaning forward or slightly sideways, the user is completely supported with the frame in the position illustrated in FIG. 2 and the ground-engaging foot on the end of the legs 24, 25 firmly in contact with the ground and the wheels 16, 17 spaced from the ground. When it is desired to move forward, the handle 20 is rocked backwardly until the wheels 16, 17 roll forward to the position as illustrated in FIG. 3, the ground-engaging foot is raised partially so that the frictional resistance is reduced to an extent sufficient to allow it to be moved by sliding over the surface. If the user is sufficiently strong to walk almost unaided, the frame can be moved by depressing the handle 20 until the mechanism is in the position illustrated in FIG. 4 where the user can then walk rolling the frame before him until such time as a further period of rest is needed when simply by moving the handle 20 upwards and forwardly the locked ground-engaging position is achieved. There is a possibility that the trolley 11 could roll only from an elderly or infirm user whose reactions are not very fast. To avoid this happening the embodiment formed as a walking frame may be further modified by the provision of secondary or subsidiary legs near the lower ends of the legs 24, 25 which legs project over the axle 15 and are attached to a second ground-engaging foot which contacts the ground on the other side of the line of contact between the wheels 16, 17 and the ground from the ground-engaging foot attached to the legs 24, 25. Thus, in such an embodiment, the wheels 16, 17 will roll only when the handle 20 is located in an intermediate position where the two ground-engaging feet are spaced from the ground and movement in either direction away from this central position will cause the mechanism to become grounded and rigid. Movement can then only take place when the operator is balanced and in control and should any unbalance or lack of control occur then the mechanism will automatically adopt a safety position where it will support the weight of a user resting on the handle.

Figure 5:
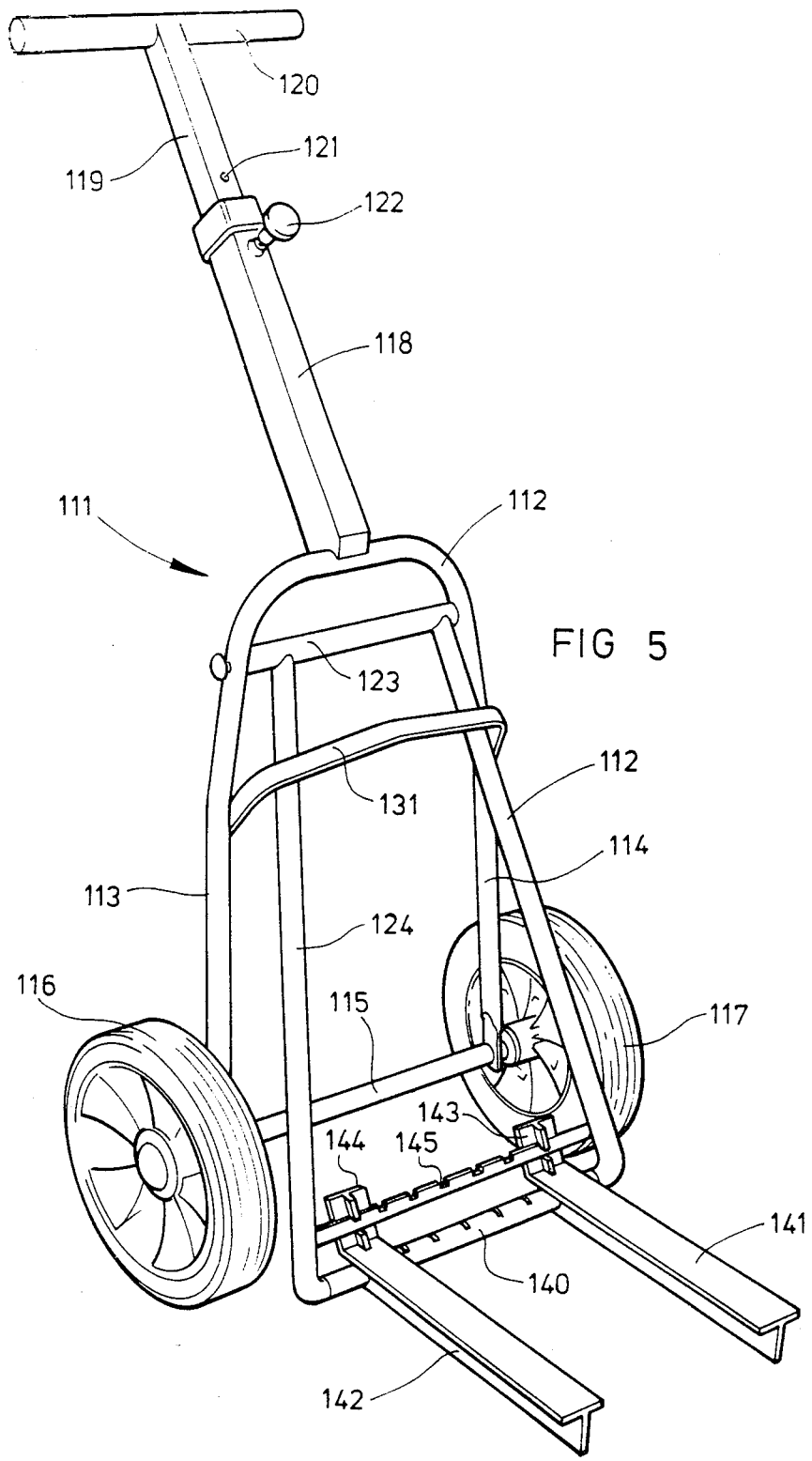
FIG. 5 is a perspective view of an alternative embodiment.

Referring now to FIG. 5, the embodiment illustrated has features in common with the embodiments of FIGS. 1-4 and corresponding or identical parts will be identified with the same reference numerals raised by 100. This embodiment differs from the embodiment previously described in that the legs 124, 125 connected to the cross member 123 are not joined at their bottom end by a platform or tray, but by a lower cross member 140, on which are pivotally mounted two T-section supports 141, 142 having cranked end sections 143, 144 respectively at the pivoted end. A stop bar 145 also spans the legs 124, 125 just above the cross member 140 and limits the pivotal movement of the members 141, 142 by engagement of the cranked end sections 143, 144. The two support members 141, 142 can be used to carry any odd shaped article, or may themselves support a platform or one of a range of different platforms of different sizes specifically adapted for mounting thereon. The particular value of the two linear support members 141, 142, however, is for enabling the trolley 11 to be used to carry a conventional pallet, on which any range of goods may be stacked. In use, the trolley 111, operates in the same way as described for the embodiment of FIGS. 1-4 with the linear support members 141, 142 lowered on the ground and the handle 120 raised, these members can be introduced into the space beneath the load-bearing platform of a pallett. Subsequently, by depressing the handle 120 to cause the trolley to turn about the axis 115, the sub-frame constituted by the legs 124, 125 and the cross member 123 is raised from the ground, elevating the platform supports 141, 142 and enabling a pallet supported thereby to be transported in a substantially horizontal orientation to any convenient location.

It is envisaged that interchangeable special purpose platforms or supports may also be provided for the embodiments of FIGS. 1-4, for example, to adapt this embodiment for carrying a dustbin which may be too large to fit on the platform 26 illustrated in FIG. 1. Such an adaptor may simply interengage on the legs 24, 25 and rest on the platform 26. Likewise, it is envisaged that the platform 26 may be pivotally connected to the legs 24, 25 instead of being fixedly connected as shown, so that the platform bottom 27 may be tipped to a position lying generally parallel to the plane defined by the legs 24, 25.

Referring now to the embodiment illustrated in FIGS. 6 and 7, there is shown a trolley adapted to carry gas bottles such as are used for oxy-acetylene welding equipment. Again, those components which are similar in function or identical to the components in the embodiments 1-4 have been identified with the same reference numerals raised by 200. Thus, a main frame 212 is shown carried on ground-engaging wheels 216, 217 and pivotally connected to a sub-frame incorporating legs 224, 225. In this embodiment, however, the legs 224, 225 are joined at the top by a cross member 246 and an encircling strap 241, and at the bottom by a shallow tray-like container 242 which together act to retain two gas bottles 243, 244 in position on the sub-frame. The main frame 212 has a handle 220 which is formed as a loop handle spanning the arms 213, 214 which have upward extensions 213a, 214a pivotally connected to the legs 224, 225 by pivots 260, 261. This pivotal interconnection between the main frame 212 and the sub-frame comprising the legs 224, 225 is a releasble connection, however, so that the main frame 212 can be released and removed leaving the gas bottles 243, 244 standing on the tray 242 in an upright orientation. This embodiment has particular advantages since it allows the main frame with its wheels to be removed away from the working environment where the welding is to take place so that it does not constitute an encumbrance, and, indeed, this may be used for transporting other articles in combination with a suitably shaped sub-frame connectable thereto. Further, owing to the great weight of the gas bottles when fully charged, the trolley of the invention has particular advantages in providing additional leverage for control and in not requiring the bottles to be tilted to a steep angle before a balance position is reached.

I claim:

1. In a wheeled mechanism for transporting a load; said mechanism comprising,
   a main frame including two main frame members defining a main frame plane in which the parts of the said main frame lie,
   at least two ground wheels mounted on said main frame so as to be turnable about a common first pivot axis, lying in said main frame plane,
   an operating handle joined to said main frame at the upper end of said main frame, said operating handle extending at an angle with respect to said main frame plane on a first side of said main frame plane, substantialy rigid secondary frame means having an uppermost end and a lowermost end, pivotal connection means pivotally connecting said rigid secondary frame means to said main frame so as to be turnable about a second pivot axis substantially parallel to said first pivot axis, and load platform means carried by said secondary frame means at said lowermost end thereof, the improvement wherein:

said rigid secondary frame means includes an upper transverse pivot member at said uppermost end thereof, said pivotal connection means pivotally connecting said rigid secondary frame means to said main frame acting to interconnect said upper transverse pivot member at said uppermost end of said rigid secondary frame means to said main frame, first secondary frame limit stop means acting to limit the pivoting movement of said secondary frame means with respect to said main frame in a first direction of pivotal movement to determine a first relative orientation of said secondary frame means and said main frame, second secondary frame limit stop means acting to limit the pivoting movement of said secondary frame means with respect to said main frame in a second direction of pivotal movement opposite said first direction of pivotal movement to determine a second relative orientation of said rigid secondary frame means and said main frame, in which said second relative orientation said rigid secondary frame and said platform means thereof both lie on a second side of said main frame plane opposite said first side thereof, the length of said secondary frame means being less than the distance from said pivotal connection means to the ground contacting points of said wheels by only a small amount such that in said first relative orientation of said rigid secondary frame means and said main frame the end of said rigid secondary frame means remote from said second pivot axis is engageable on the ground with said load platform being substantially parallel to and in contact with the ground and said ground wheels being also in contact with the ground, whereby said mechanism is in a stable configuration allowing said platform to be loaded and unloaded, wherein said platform is raised from the ground upon relative turning movement of said rigid secondary frame means and said main frame about said second axis to said second relative orientation thereof whereby to permit transport of a load on said load platform with said load platform being substantially horizontal, and wherein upon such relative turning movement of said rigid secondary frame means and said main frame to pass from said first relative orientation to said second relative orientation said load platform experiences no substantial tipping from said substantially horizontal position that it occupies in both said first and said second relative orientations.

2. The wheeled mechanism of claim 1, wherein said load platform means has a length in a direction transverse to said common first axis of said wheels, and a width in a direction parallel to said common first axis of said wheels, said length of said load platform means being at least as great as said width.

3. The wheeled mechanism of claim 1, wherein said common first axis of said wheels moves towards said load platform means when said rigid secondary frame means and said main frame move about said second axis to said second relative orientation thereof, and wherein said movement of said first axis is brought about solely by movement of said operating handle.

4. The wheeled mechanism of claim 1 wherein said main frame includes an axle joining said at least two ground wheels, and said second secondary frame limit stop means is defined by said axle whereby contact between said rigid secondary frame and said axles determines the limit of relative pivoting movement between said rigid secondary frame and said main frame.

5. The wheeled mechanism of claim 1 wherein with said wheels of said main frame in contact with the ground and said mechanism in said first relative orientation of said rigid secondary frame means and said main frame, the height of said pivotal connection means from the ground increases at least initially as said mechanism is moved from said first relative orientation of said rigid secondary frame means and said main frame towards said second relative orientation thereof.

6. The wheeled mechanism of claim 1 wherein said rigid secondary frame means is formed as a frame incorporating a cradle for supporting at least one gas bottle.

7. The wheeled mechanism of claim 1, wherein said pivotal connection between said rigid secondary frame means and said main frame is releasable in such a way as to allow said wheeled main frame to be removed leaving said rigid secondary frame means standing independently on the ground.

8. The wheeled mechanism of claim 1, wherein said load platform means is formed as a tray rigidly secured to said rigid secondary frame means and projecting therefrom transversely of a plane joining its point of attachment to said rigid secondary frame means with said pivoted end thereof at said second pivot axis.

9. The wheeled mechanism of claim 1, wherein said load platform means is turnable between a rest position in which it lies generally parallel to the length of said rigid secondary frame means and an operative position in which it projects transversely of a plane joining its point of attachment to said rigid secondary frame means with said second pivot axis.

* * * * *